(No Model.)
D. A. SPITLER.
COMBINED HARROW AND REPLANTER.
No. 338,114. Patented Mar. 16, 1886.
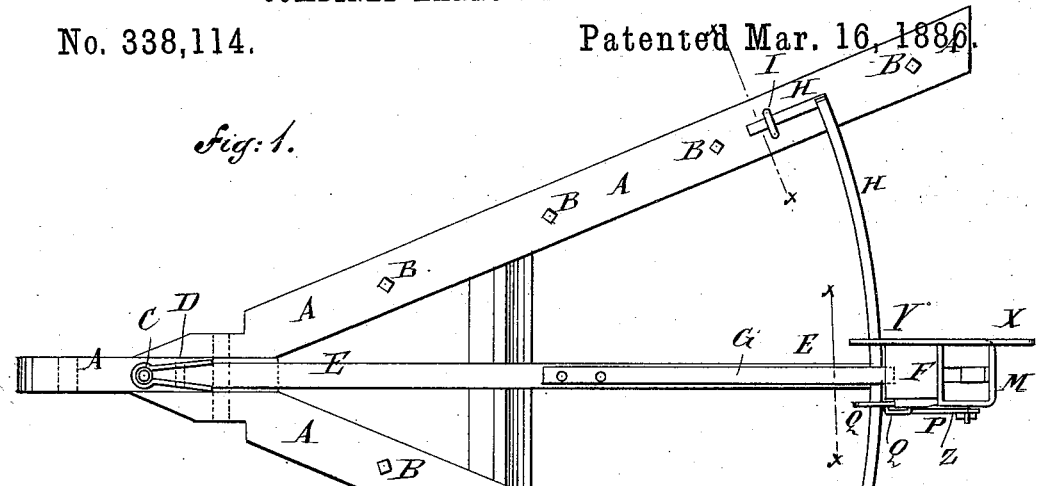
Fig. 1.
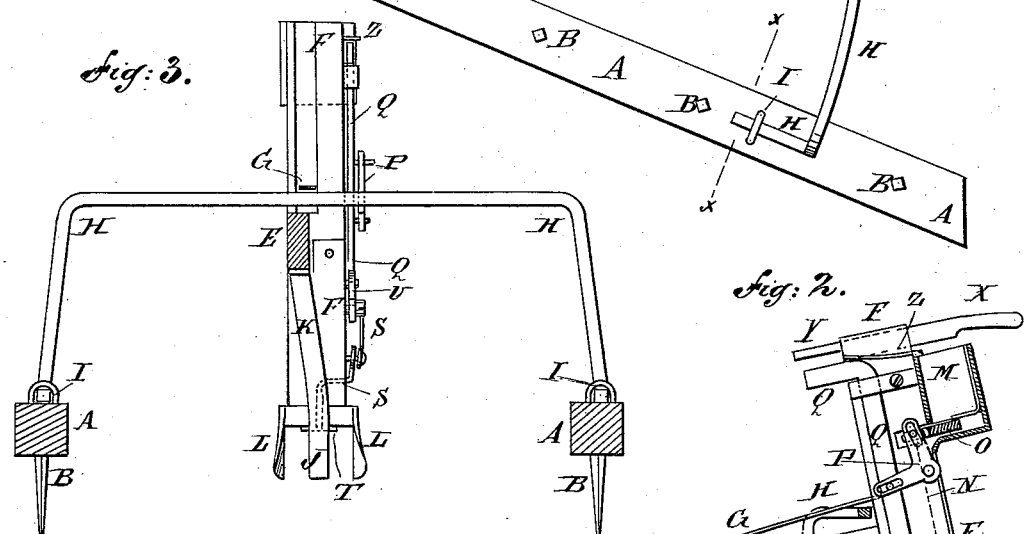
Fig. 3.
Fig. 2.
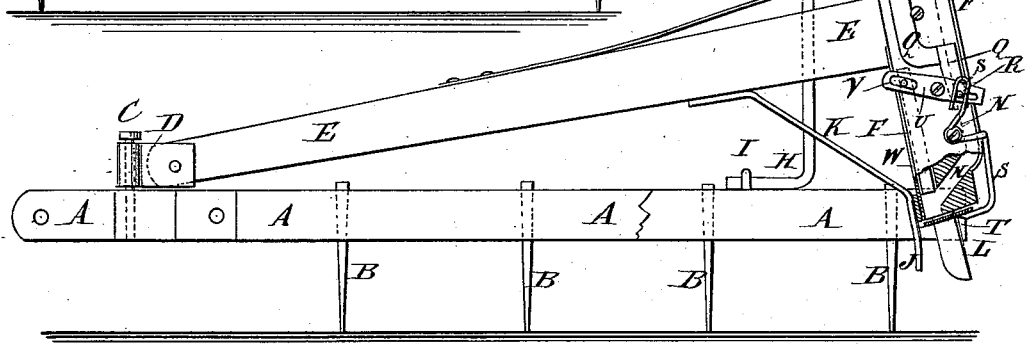
WITNESSES:
Chas. Nider
C. Sedgwick
INVENTOR:
D. A. Spitler
BY Munn & Co.
ATTORNEYS.

UNITED STATES PATENT OFFICE.

DAVID A. SPITLER, OF FLORA, INDIANA.

COMBINED HARROW AND REPLANTER.

SPECIFICATION forming part of Letters Patent No. 338,114, dated March 16, 1886.

Application filed August 10, 1885. Serial No. 174,026. (No model.)

*To all whom it may concern:*

Be it known that I, DAVID A. SPITLER, of Flora, in the county of Carroll and State of Indiana, have invented new and certain Improvements in Combined Harrows and Replanters, of which the following is a full, clear, and exact description.

Reference is to be had to the accompanying drawings, forming part of this specification, in which similar letters of reference indicate corresponding parts in all the figures.

Figure 1 is a plan view of one of my combined harrows and replanters. Fig. 2 is a side elevation of the same, partly in section and parts being broken away. Fig. 3 is a sectional front elevation of the same, taken through the lines $x\,x\,x\,x\,x\,x$, Fig. 1.

The object of this invention is to provide combined harrows and replanters constructed in such a manner that missing hills can be replanted conveniently and accurately while harrowing the plants for the first time.

The invention consists in the construction and combination of various parts of the machine, as will be hereinafter fully described, and then pointed out in the claims.

A represents an ordinary harrow, the inclined side bars of which are provided with teeth B.

To the draw-bar of the harrow A is hinged by a pin or bolt, C, a strap-clevis, D, to and between the arms of which is hinged the forward end of a beam, E. To the rear end of the beam E is rigidly attached the middle part of a standard, F. To the middle part of the beam E is attached the forward end of the spring G, the rear end of which extends to the forward side of the standard F, and which is made of sufficient strength to support the weight of the beam E and its attachment. The rear end of the spring G rests upon the horizontal middle part of the arched bar H, which part is curved upon the arc of a circle having its center in the pin C of the clevis D. The arms of the arched bar H, at points directly over the side bars of the harrow A, are bent downward into vertical positions, and at the upper sides of the said harrow-bars the said arms are bent at right angles in such direction as to be parallel with and rest upon the said upper sides of the harrow-bars, and are passed through staples or other keepers, I, attached to the said harrow-bars. The vertical arms of the arched bar H are made of such a length that the lower end of the standard F will be supported at such a height from the ground as to pass over the small plants without injuring them.

To the forward side of the lower end of the standard F is attached a plow, J, to open the ground to receive the seed. The standard K of the plow J is inclined forward, and its upper end is attached to the lower side of the beam E, to serve as a brace for the standard F.

The seed is covered by plows L, attached to the sides of the lower end of the standard F.

To the rear side of the upper end of the standard F is attached the seed-box M, from the forward edge of the bottom of which a channel, N, leads down along the rear side of the standard F nearly to the lower end of the said standard, and then inclines forward and downward to the forward side of the said lower end of the said standard.

The seed is removed from the seed-box M and dropped into the channel N by the hole in the seed-dropping slide O, placed in a slot in the forward side of the lower part of the seed-box M.

To the forward end of the seed-dropping slide O is attached a pin, which passes through a slot in the upper arm of the elbow-lever P. The elbow-lever P is pivoted at its angle to the standard F, and through a slot in its forward arm passes a pin attached to the sliding bar Q, which slides in keepers attached to the side of the standard F. The upper end of the sliding bar Q is bent forward at right angles and projects in front of the standard F, so that the said sliding bar will be operated to operate the elbow-lever P and drop the seed by the said projecting end coming in contact with the arched bar H when the said standard F is forced downward. The sliding bar Q, at about the level of the lower side of the beam E, is bent to the rearward and is then bent downward, and to it is attached a pin, R, which passes through an inclined slot in the upper arm of the bent lever S. The lever S is pivoted to the side of the standard F, and to its lower end is attached a valve-plate, T, which rests against the lower end of the standard F and closes the lower end of the passage N. The pin R also passes through a short slot in the rear arm of the short lever U, pivoted to the side of the standard F, and which has a short slot in its forward arm to receive a pin, V, attached to the bar W, which slides in a vertical groove in the forward part of the standard F, and directly over the lower end of the channel N the sliding bar W is made of such a length that its lower end will be a little above the lower end of the standard F when the forward end of the lever U is at the limit of its upward movement, and will be flush with the lower end of the said standard when the forward end of the lever U is at the limit of its downward movement.

The standard F is moved down and up by means of a rearwardly-projecting arm or handle, X, attached to its upper end. The downward movement of the standard F is limited by a forwardly-projecting arm, Y, attached to the upper end of the said standard F, and which comes in contact with the arched bar H. With this construction, when the harrow A is being drawn along a row of plants to kill the weeds and loosen the soil, the standard F and its attachments are supported above the ground by the spring G, which rests and slides upon the arched bar H. When a place is reached where the seed has not germinated or has not been planted, the standard F is forced downward by pressure upon the handle X, causing the plow J to open a channel in the ground to receive the seed. As the standard F moves downward the forwardly-projecting end of the sliding bar Q comes into contact with the arched bar H and is stopped, which causes the said bar Q to operate the elbow-lever P and force the slide O into the seed-box M, to receive seed, and to operate the bent lever S to withdraw the valve-plate T and drop the seed in the lower part of the said channel N into the furrow opened by the plow J, where it is covered by the plows L. The same movement of the bar Q causes the lever U to force the bar W downward to insure a prompt discharge of the seed in the bottom of the channel N and to keep the discharge-opening free. As the standard F is again raised the bar Q is forced downward by the spring Z, operating the elbow-lever P and slide O to drop seed into the channel N closing the valve-plate T to receive the falling seed, and raising the bar W out of the way ready to again plant a hill when the standard F is again pressed downward.

The standard F must be moved downward and upward quickly to plant the seed in the right place and to keep the plows from injuring the plants of the next hill.

Having thus described my invention, what I claim as new, and desire to secure by Letters Patent, is—

1. The combination, with the harrow A and the beam and standard E F, carrying a seed-dropping mechanism, of the bolt and clevis C D, the spring G, and the arched bar H, substantially as herein shown and described, whereby the said beam and standard will be carried above the ground when not in use, and can be quickly lowered into contact with the ground when a hill is to be replanted, as set forth.

2. In a combined harrow and replanter, the combination, with the standard F, the arched bar H, and the seed-box M, of the sliding bar Q, having a forwardly-projecting upper end, the elbow-lever P, the seed-dropping slide O, and the spring Z, substantially as herein shown and described, whereby the said slide will be operated to receive and drop seed by the downward and upward movement of the said standard, as set forth.

3. In a combined harrow and replanter, the combination, with the standard F, having channel N, and the arched bar H, of the sliding bar Q, the spring Z, the elbow-lever and slide P O, the bent and slotted lever S, and the valve-plate T, substantially as herein shown and described, whereby the same movement of the sliding bar that operates the seed-dropping slide to receive and drop the seed at the upper end of the standard will operate the valve-plate at the lower end of the said standard to drop and receive seed, as set forth.

4. In a combined harrow and replanter, the combination, with the standard F, having channel N, the arched bar H, the spring Z, the elbow-lever and slide P O, and the bent lever and valve-plate S T, of the slotted lever U and the sliding bar W, substantially as herein shown and described, whereby the discharge-opening is kept free and the prompt discharge of the seed is insured, as set forth.

DAVID A. SPITLER.

Witnesses:
THOMAS G. DUDLEY,
ELI SLAWFER.